Figure 1:
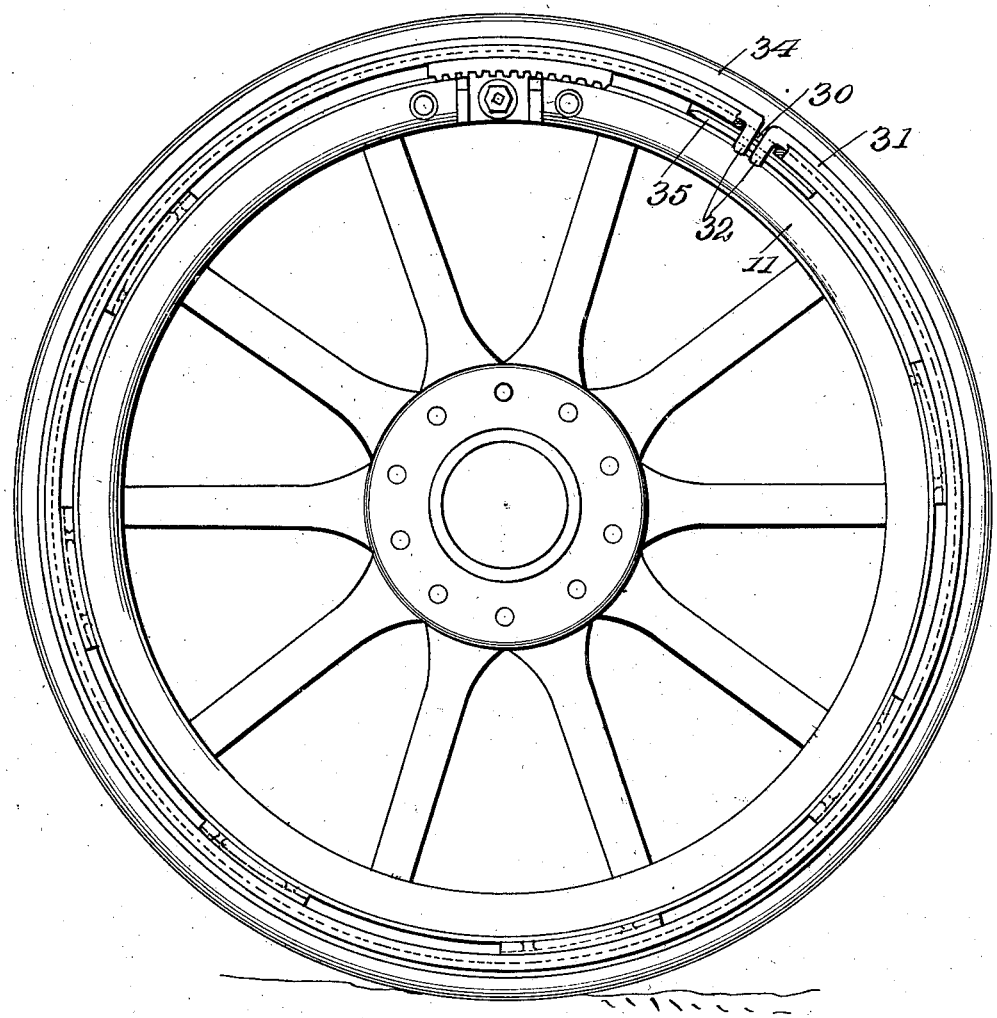

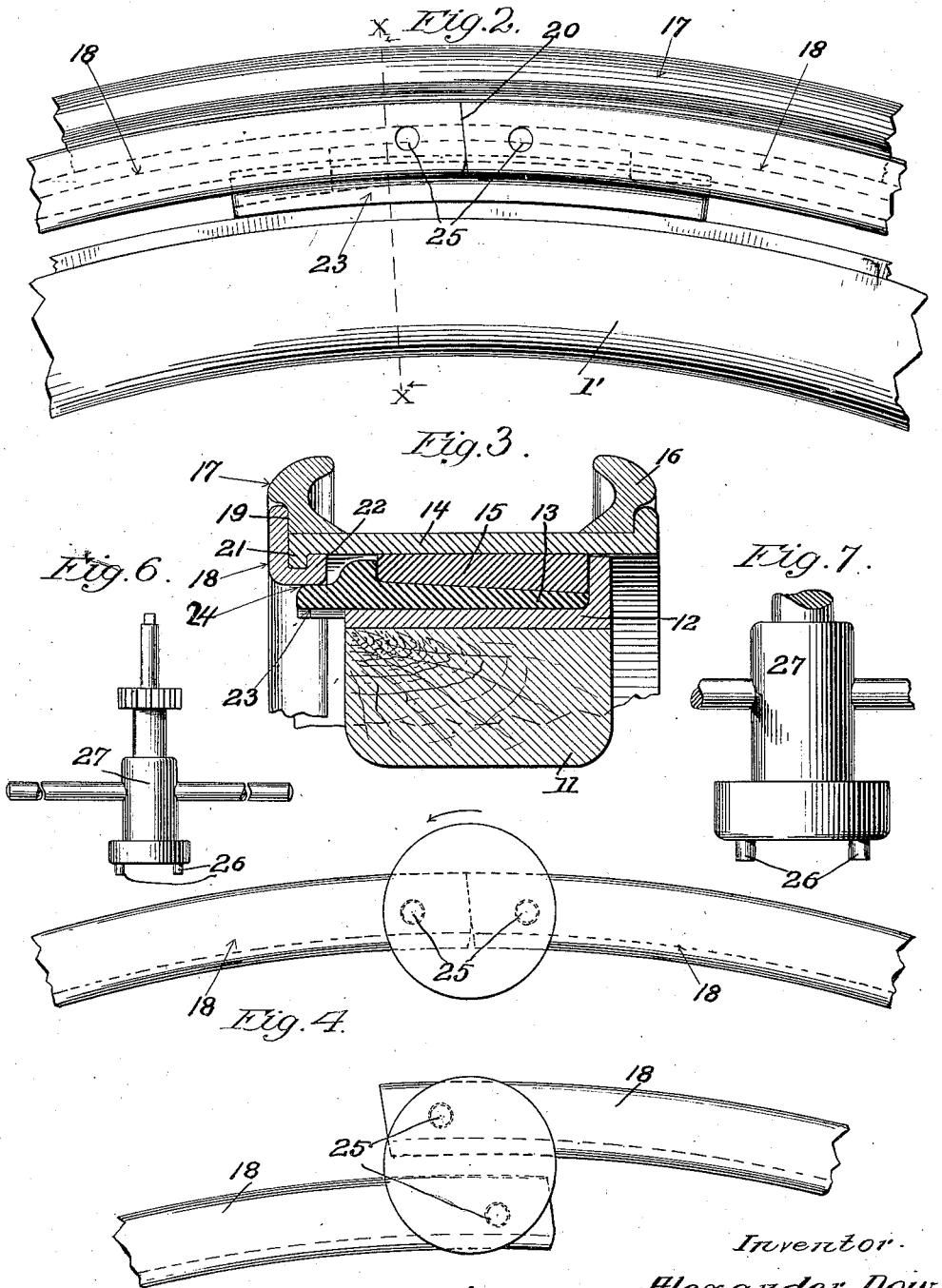

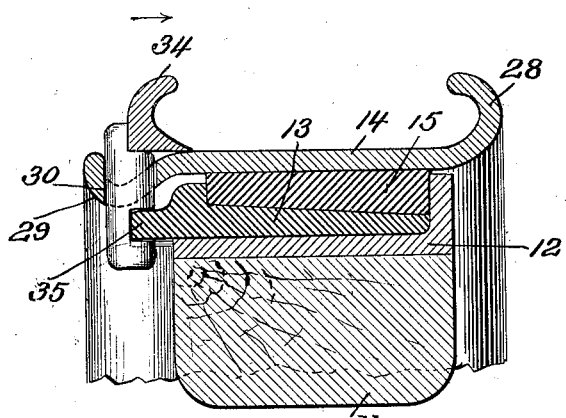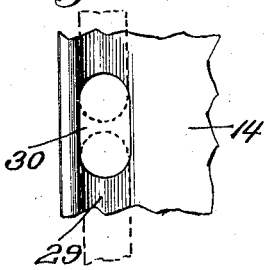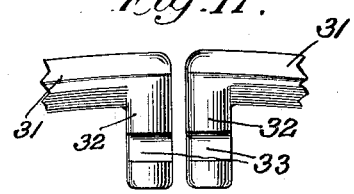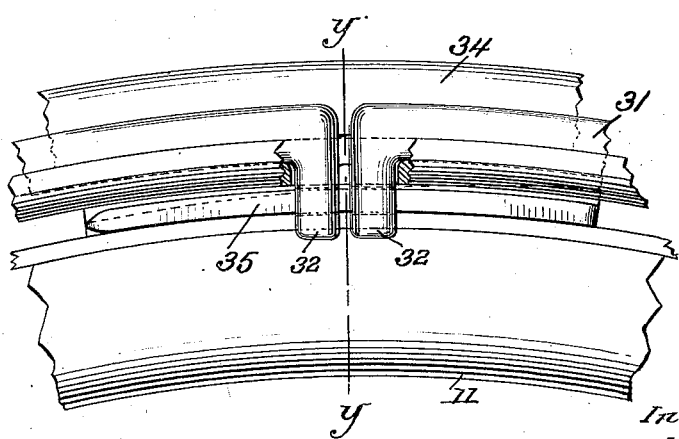

UNITED STATES PATENT OFFICE.

ALEXANDER DOW, OF NEW YORK, N. Y., ASSIGNOR TO DOW RIM COMPANY, OF NEW YORK, N. Y., A CORPORATION OF NEW YORK.

MEANS FOR LOCKING DETACHABLE FLANGES ON DEMOUNTABLE RIMS.

959,426.  Specification of Letters Patent.  Patented May 24, 1910.

Application filed December 11, 1909. Serial No. 532,659.

*To all whom it may concern:*

Be it known that I, ALEXANDER DOW, a citizen of the United States, residing at New York, in the county of New York and State of New York, have invented certain new and useful Improvements in Means for Locking Detachable Flanges on Demountable Rims, of which the following is a specification.

My invention relates to means for locking detachable flanges on demountable tire rims, whereby the flanges are prevented from becoming loose on the rim, flying off and releasing the tire secured thereby.

My invention is applicable to substantially any of the well known types of detachable flange when applied to a demountable rim.

While my invention may be used in connection with substantially any detachable flange I have shown the same in order to illustrate my invention when used in connection with what is known as the Marsh detachable rim, in which the retaining ring expands to hold the flange on the rim, and I have also shown the same as applied to what is known as the standard universal quick detachable rim, in which the detachable flange is retained in position by a ring which contracts around the rim of the wheel to secure the detachable flange onto the rim.

The form of demountable rim which I have illustrated is that shown in my prior Patent No. 922,404, granted May 18, 1909. It is evident, however, that the use of my invention is not to be limited to the forms of detachable flanges or to the form of demountable rim herein shown and described.

With these and other objects in view my invention consists broadly in a demountable rim having a detachable tire retaining flange thereon and means brought into operation by the locking of the rim to the felly, to cause a device to engage a part of the detachable flange and lock it in position.

My invention further consists in certain constructions, combinations and arrangements of parts the preferred form of which will be first described in connection with the accompanying drawings and then the invention particularly pointed out in the appended claims.

Referring to the drawings wherein the same part is designated by the same reference numeral wherever it occurs Figure 1 is a side view of a wheel showing one embodiment of my invention; Fig. 2 is a side elevation of an embodiment of my invention when used in connection with the Marsh detachable flange; Fig. 3 is a section taken on line $x$ $x$ of Fig. 1 and looking in the direction of the arrow; Fig. 4 is a side elevation of a portion of the retaining ring showing a wrench in position to unlock the ring; Fig. 5 is a similar view showing the ring unlocked; Figs. 6 and 7 are views of a wrench adapted to unlock the ring; Fig. 8 is a section taken on line Y $y$ of Fig. 9, showing my invention when used in connection with the standard universal quick detachable rim; Fig. 9 is a side elevation of Fig. 8 with parts broken away; Fig. 10 is a top plan view of a portion of the rim and Fig. 11 is a side view of the adjacent ends of the retaining ring.

11 designates the felly shown as having attached thereto a felly band 12 and on which at intervals are located the tapering wedges 13.

14 is the demountable tire rim secured to which are the wedges 15 adapted to coöperate with the wedges 13 to lock the rim on the felly.

This construction forms no part of my present invention, as it is the same as that shown in my prior Patent 922,404 above referred to and is merely shown as illustrating one form of demountable rim to which my invention may be applied.

Referring to Figs. 1 to 6 inclusive wherein I show my invention as adapted to the type of detachable flange known as the Marsh rim, 16 is a tire retaining flange adapted to be slipped over the rim body from the outer edge thereof. 17 is a tire-retaining flange adapted to be positioned upon the rim-body on the outer edge thereof after the tire has been placed in position. The flange 17 is maintained against outward movement off the face of the rim body, due to the pressure of the tire by contacting with the locking ring 18 which engages the tire retaining flange at 19. This locking ring is split as shown at 20 and is adapted to be positioned by being sprung inwardly and then permitted to expand into position upon the down-turned flange 21 of the rim body, where it is held against outward movement by the engagement of the inner flange 22 with the flange 21. When in position, the locking ring 18, which is U-shaped in cross section, embraces the down-turned flange 21 and is held thereon by its own expansion.

The foregoing is a description of the well known Marsh type of rim and forms no part of my invention.

By my invention I provide means to lock the split ring 18 onto the flange 21, so that it cannot come off while the rim is locked onto the felly. As shown this consists of a projection carried by the felly and which is adapted, when the rim and felly are given a relatively circumferential movement, to lock them together, whereby the projection is moved beneath the split 20 in the ring to prevent the ends of the ring from being moved to the position shown in Fig. 5, as they must do before the ring can come off the flange 21.

In the form of my invention shown I provide a projection 23 on one of the wedges 13 of the felly which, when the rim is locked on the felly, will contact with the under side 24 of the ring and beneath the split 20, whereby the ring is absolutely prevented from being forced off the flange 21.

In order to remove the retaining ring it is necessary to first demount the rim from the felly in the manner described in my patent referred to and then by springing the ends of the split ring to the position shown in Fig. 4 the ring can be removed. In order to readily spring this ring to remove the same I have shown the ring adjacent its ends as provided with the holes 25 into which the projecting lugs 26 of a wrench 27 may be placed when by rotating the wrench the ring can be removed as is clearly illustrated by Figs. 4 and 5.

In Figs. 8 to 11 inclusive I have illustrated my invention as applied to demountable rims of the character disclosed in my prior patent above referred to, equipped with what are known in the trade as standard universal quick detachable rims. The rim 14 is shown as turned up at one side to form a permanent tire retaining flange 28 and on the opposite edge of the rim a depression or channel 29 is formed, having an opening 30 in the channel at one portion of the circumference of the rim. 31 is the retaining ring which is split and has its ends turned inward as shown at 32. 33 designates channels cut in one side of the inturned ends 32. 34 is the detachable tire-retaining flange which slips over the edge of the rim and is held in place by the retaining ring 31 which fits in the channel 29 with the down-turned ends 32 of the ring extending through the opening. Except for the channels 33 cut in the ends 32, the construction is that of the well known type of detachable flanges and forms no part of my invention. In order to lock these retaining rings in position and thus prevent the ring from becoming accidentally detached I provide a part carried by the felly which is adapted to engage the retaining ring when the rim is locked to the felly, and lock the ring in position.

In the form of my invention illustrated in Figs. 8 to 11 inclusive this is effected by providing one of the wedges 13 of the felly with a laterally projecting portion 35 adapted, when the rim and felly are given their relative circumferential movement, to enter the channels 33, and thus lock the retaining ring to the rim. In order to remove the retaining ring it is necessary to first demount the rim when the ring can be pried out of the channel in the ordinary manner.

I realize that great variation is possible in the details of construction and arrangement of parts without departing from the spirit of my invention, and I therefore do not intend to limit myself to the specific form shown and described.

Having thus described my invention what I claim as new and desire to secure by Letters Patent it:

1. In a wheel, a fixed member, a demountable rim therefor, means to secure the rim to the fixed member, a split ring on the rim, the fixed member having a part to engage the end portions only of the split ring to lock it in position when the rim is secured to the fixed member.

2. In a wheel, a fixed member, a demountable rim therefor, means to secure the rim to the fixed member, a detachable tire retaining flange on the rim, a removable split ring for retaining said flange, the fixed member having a part to engage the end portions only of the split ring when the rim is secured to the fixed member.

3. In a wheel, a fixed member, a demountable rim therefor, means to secure the rim to the fixed member, a split ring on the rim, a projection on the fixed member to engage the end portions only of the split ring when the rim is secured to the fixed member.

4. In a wheel, a fixed member, a demountable rim therefor, means to secure the rim to the fixed member, a split ring on the rim, the ends of the ring being provided with inturned ends having slots therein, a projection on the fixed member adapted to engage the channels in the end portions of the split ring when the rim is secured to the fixed member.

5. In a wheel, a fixed member, a demountable rim therefor, coöperating locking means carried by the fixed member and the demountable rim adapted to be brought into engagement with each other by a relative circumferential movement of the rim, a split ring on the rim, and a projection on one of the coöperating locking devices mounted on the fixed member adapted to engage the split ring at its end portions when the rim is locked on the fixed member to lock the split ring on the rim.

In testimony whereof I affix my signature in presence of two witnesses.

ALEXANDER DOW.

Witnesses:
 HARRY D. CUE,
 FRANCIS M. PHELPS.